United States Patent [19]
Deneau et al.

[11] Patent Number: 5,564,769
[45] Date of Patent: Oct. 15, 1996

[54] REINFORCED INSTRUMENT PANEL ASSEMBLY

[75] Inventors: Kenneth S. Deneau, Troy; James A. Cotton, Royal Oak; Dean M. Martin, Livona; Patrick J. Gibbons, Royal Oak, all of Mich.

[73] Assignee: Chrysler Corporations, Auburn Hills, Mich.

[21] Appl. No.: 357,882

[22] Filed: Dec. 19, 1994

[51] Int. Cl.$^6$ .................................. B62D 25/14
[52] U.S. Cl. .......................... 296/72; 280/752; 180/90; 296/189
[58] Field of Search .............................. 296/70, 72, 194, 296/189; 280/748, 750–752, 779, 780; 180/90

[56] References Cited

U.S. PATENT DOCUMENTS

| | | | |
|---|---|---|---|
| 803,356 | 10/1905 | Patterson | 296/72 |
| 4,655,475 | 4/1987 | Van Gelderen | 280/779 |
| 5,082,078 | 1/1992 | Umeda et al. | 296/70 X |
| 5,114,182 | 5/1992 | Thull et al. | 280/779 |
| 5,387,023 | 2/1995 | Dengau | 296/72 |

FOREIGN PATENT DOCUMENTS

| 200547 | 8/1990 | Japan | 280/750 |
|---|---|---|---|

Primary Examiner—Dennis H. Pedder
Attorney, Agent, or Firm—Edward A. Craig

[57] ABSTRACT

A reinforced instrument panel assembly capable of being preassembled and then installed as a unit in a motor vehicle. The instrument panel assembly comprises an instrument panel and motor vehicle instruments mounted on a rigid reinforcing bar. A mounting bracket is secured to each end of the reinforcing bar. When the preassembled instrument panel assembly is placed inside the vehicle body and moved forwardly to the installed position, the mounting brackets contact side frame members of the vehicle body and are readily accessible to the installer so that the mounting brackets can be secured to the side frame members quickly and easily. The instrument panel assembly can be moved to a position for installation with a direct forward movement in an ergonomic manner. Hooks on the mounting brackets guide the instrument panel assembly to its installed position. When the instrument panel is installed, the reinforcing bar serves as a brace to resist the effect of side impact on the body in a collision. The securement of the mounting bracket to the side frame member on the driver side of the vehicle includes a slotted connection which is capable of releasing in the event of a frontal impact when the driver is thrown forwardly against the instrument panel assembly. The reinforcing bar has crush-inducing formations enabling it to bend and crush in a frontal impact.

12 Claims, 4 Drawing Sheets

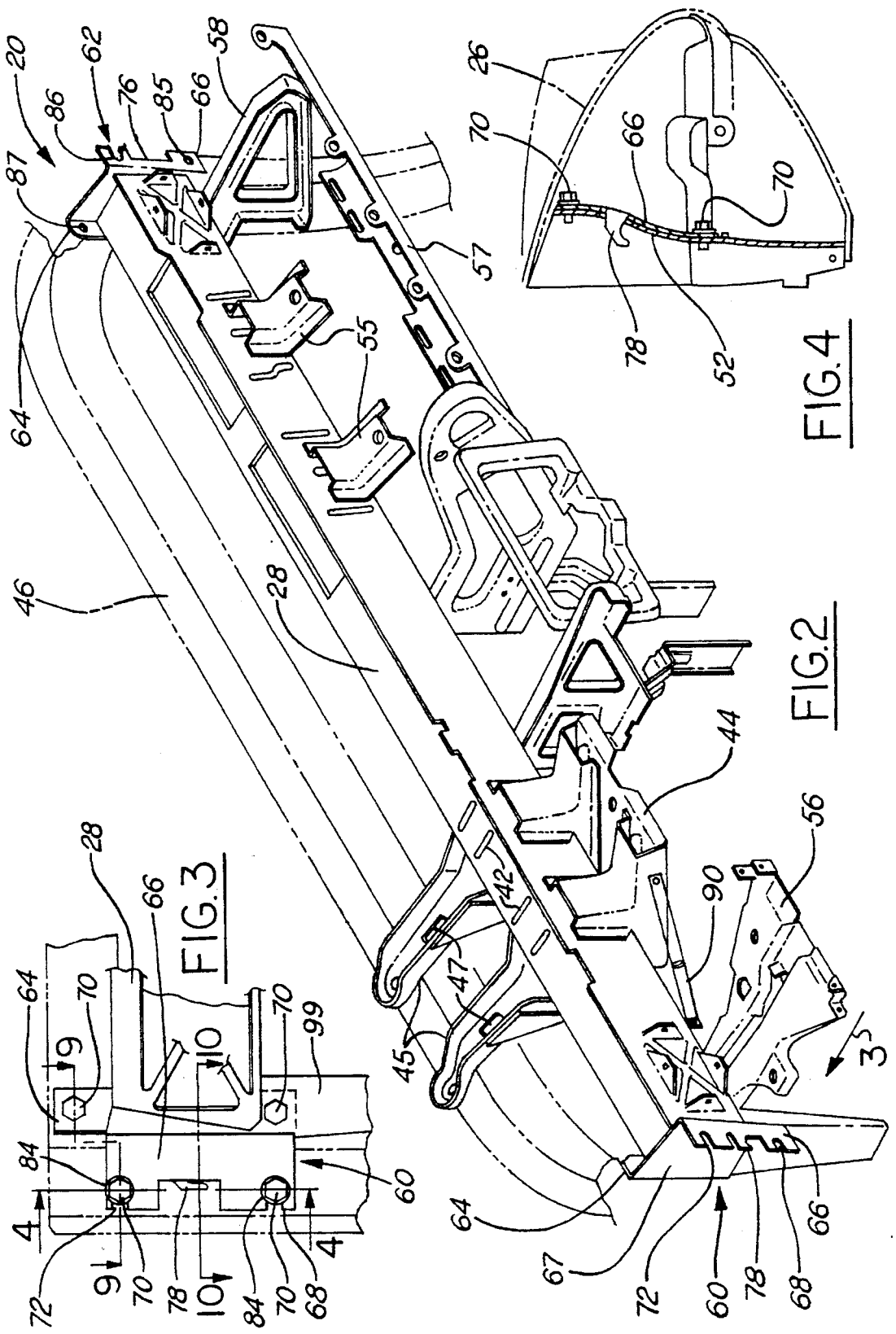

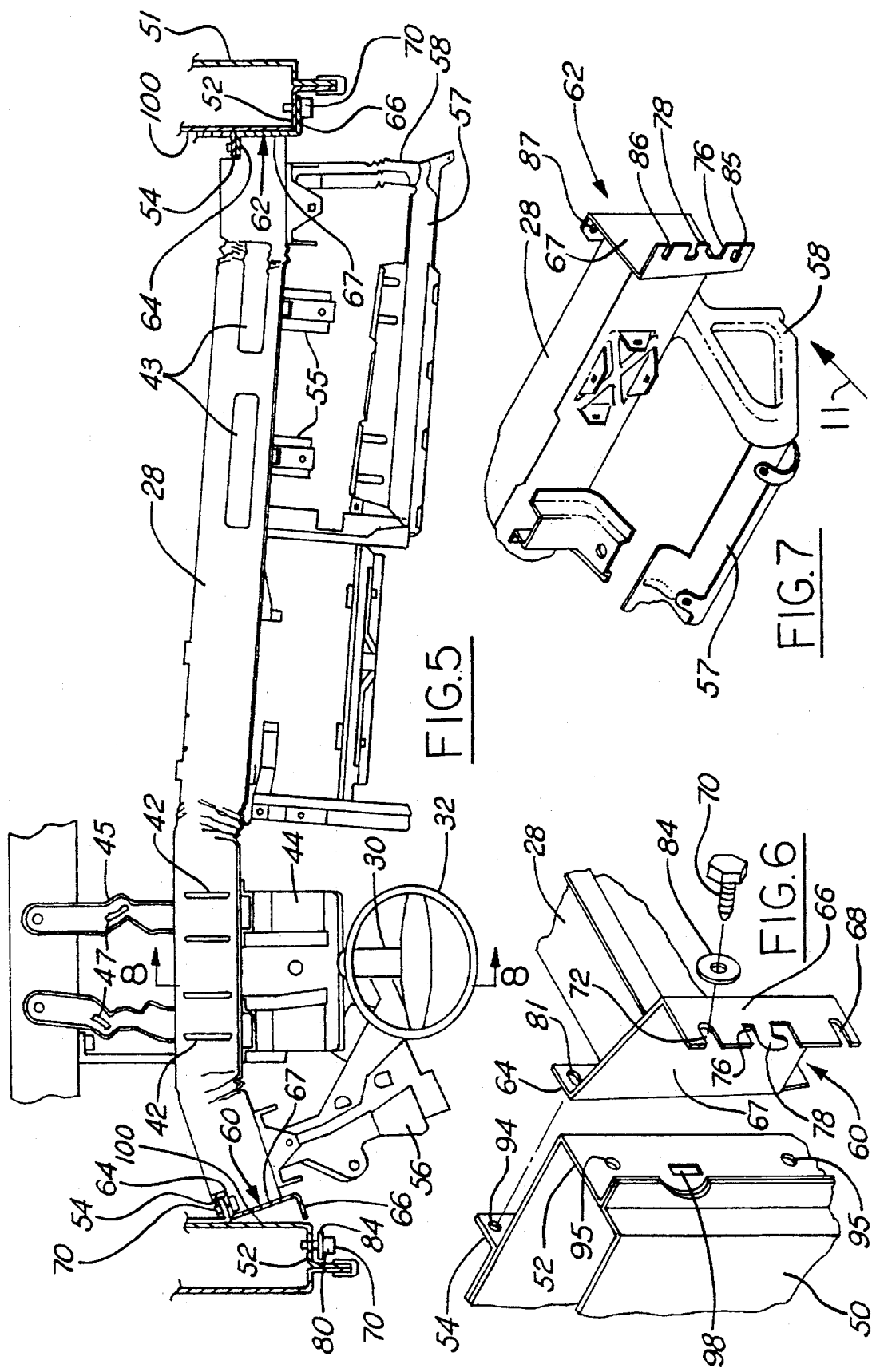

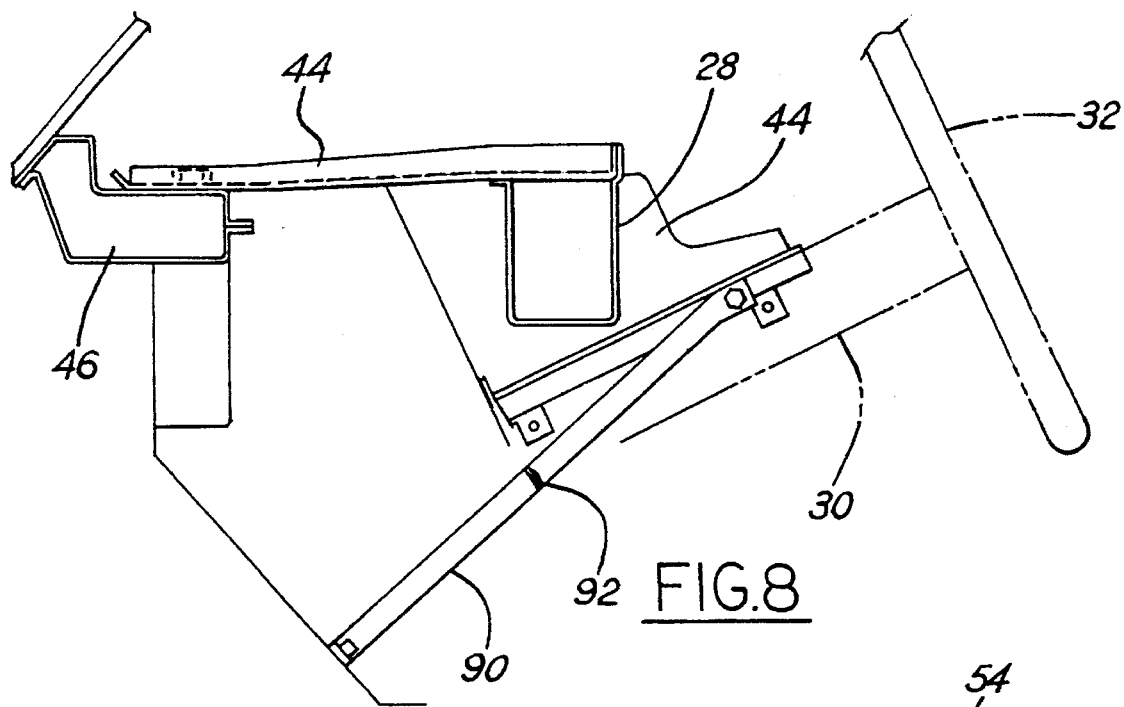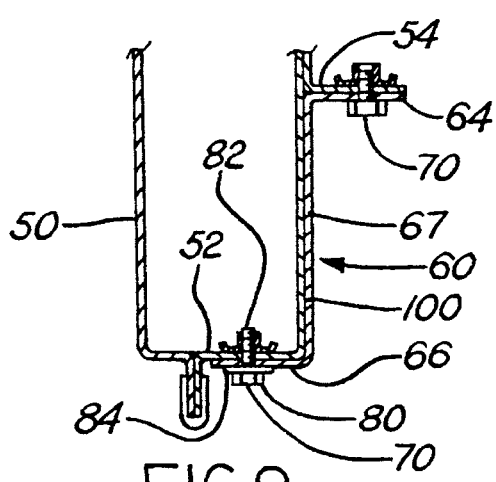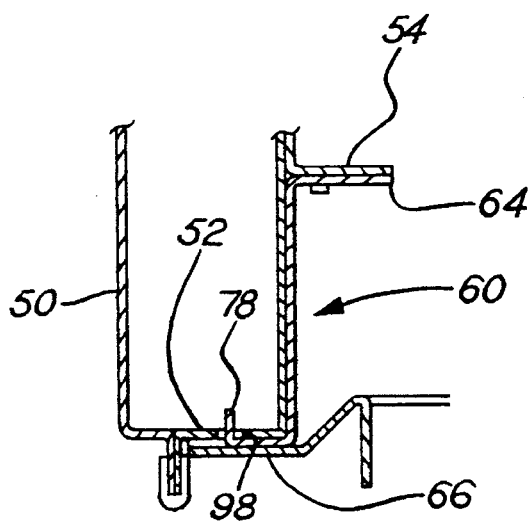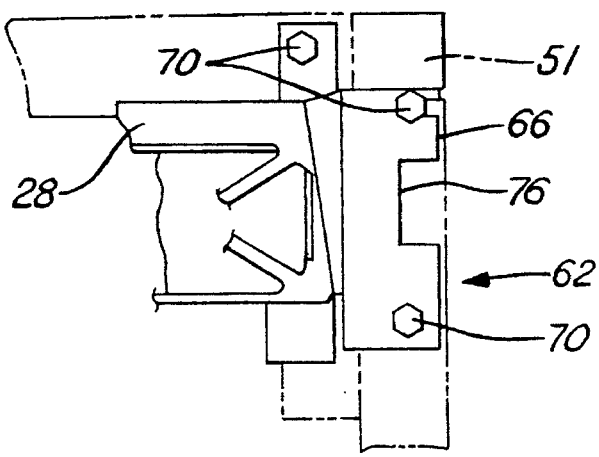

REINFORCED INSTRUMENT PANEL ASSEMBLY

FIELD OF THE INVENTION

This invention relates generally to a reinforced instrument panel assembly capable of being preassembled and then installed as a unit in an automotive vehicle.

BACKGROUND AND SUMMARY

The conventional way of installing an instrument panel and the various components associated with the instrument panel is to install them separately. This requires a person to install each individual part from a position inside a car body and is very time consuming.

In accordance with the present invention, an instrument panel assembly is made up of an instrument panel, various components or instruments associated with the instrument panel, and an elongated reinforcing bar to which the instrument panel and components are connected. All of these parts are preassembled outside the car body and then the assembly is introduced as a unit into the car body and attached.

The reinforcing bar has brackets at the ends which are conveniently placed to engage side frame members of the vehicle by a simple forward movement of the instrument panel assembly. The brackets are readily accessible to the installer and can be secured to the side frame members by fasteners in a very simple and speedy operation. Since the instrument panel is preassembled, the working time within the vehicle is reduced to a minimum. When the instrument panel assembly is installed, the reinforcing bar, which extends from one side of the vehicle to the other, serves as a brace to resist the effect of a side impact on the vehicle in a collision.

The reinforcing bar preferably is a tubular member of relatively thin wall construction which is sufficiently strong in compression to brace the car body in the event of a side impact, but which allows the bar to bend and deflect and thus cushion the reaction force on the driver when the driver is thrown forward against the steering wheel in a frontal impact. Preferably, the reinforcing bar has crush-inducing formations which also contribute to the ability of the bar to bend and deflect in the event of a frontal impact.

The brackets at the ends of the reinforcing bar have flanges which are attached to side frame members of the vehicle by suitable fasteners extending through openings in the flanges. The fastener openings in one of the flanges on the driver's side are slotted openings which open laterally outwardly through the outer edges of the flange so that the flange can pull away from the fasteners in the event of a vehicle frontal impact when the driver is thrown forwardly against the instrument panel assembly. This allows for increased deflection and bending of the reinforcing bar and cushioning of the reaction force against the driver's chest.

Washers, preferably of anti-friction material, may be placed between one of the bracket arms and the heads of the fasteners in the slotted openings therein so that the bracket may more readily pull away from the fasteners in a frontal impact.

Preferably, the reinforcing bar is provided with additional mounting bracket arms which extend forwardly of the reinforcing bar and attach to rigid vehicle frame structure. These additional bracket arms are preferably formed with upsets and/or cut-outs of a crush-inducing nature so that they will crush or crumple under impact and thus have a further cushioning effect.

Preferably, an elongated shake brace is provided to stabilize the steering column during normal operation of the vehicle. This shake brace preferably extends generally in a fore and aft direction and is provided with a crush-inducing formation intermediate its length to promote bending or crushing in response to the effect of a vehicle frontal impact.

One object of this invention is to provide a reinforced instrument panel assembly having the foregoing features.

Another object is to provide a reinforced instrument panel assembly which is composed of a relatively few simple parts, is rugged and durable in use, and is relatively inexpensive to manufacture and easy to install.

Other objects, features and advantages of the invention will become more apparent as the following description proceeds, especially when considered with the accompanying drawings.

BRIEF DESCRIPTION OF THE DRAWINGS

FIG. 2 is a perspective view similar to FIG. 1 showing the reinforcing bar of the instrument panel assembly and some of the attaching brackets, but with the instruments and the instrument panel removed.

FIG. 3 is a view looking in the direction of the arrow 3 in FIG. 2 showing one end of the instrument panel assembly attached to the car body.

FIG. 4 is a sectional view taken on the line 4—4 in FIG. 3.

FIG. 5 is a top view showing the reinforcing bar and some of the attaching brackets, but with the instrument panel and various instruments removed. The reinforcing bar is shown after it has been bent and partially collapsed due to a vehicle frontal impact.

FIG. 6 is an exploded perspective view taken generally in the direction of the arrow 6 in FIG. 1.

FIG. 7 is a perspective view showing the right end portion of the structure in FIG. 2, as seen from the opposite side.

FIG. 8 is a sectional view taken on the line 8—8 in FIG. 5 in the condition of the parts in which there has been no frontal impact.

FIG. 9 is a sectional view taken on the line 9—9 in FIG. 3.

FIG. 10 is a sectional view taken on the line 10—10 in FIG. 3.

FIG. 11 is a view looking in the direction of the arrow 11 in FIG. 7.

DETAILED DESCRIPTION OF A PREFERRED EMBODIMENT

Figure 1:
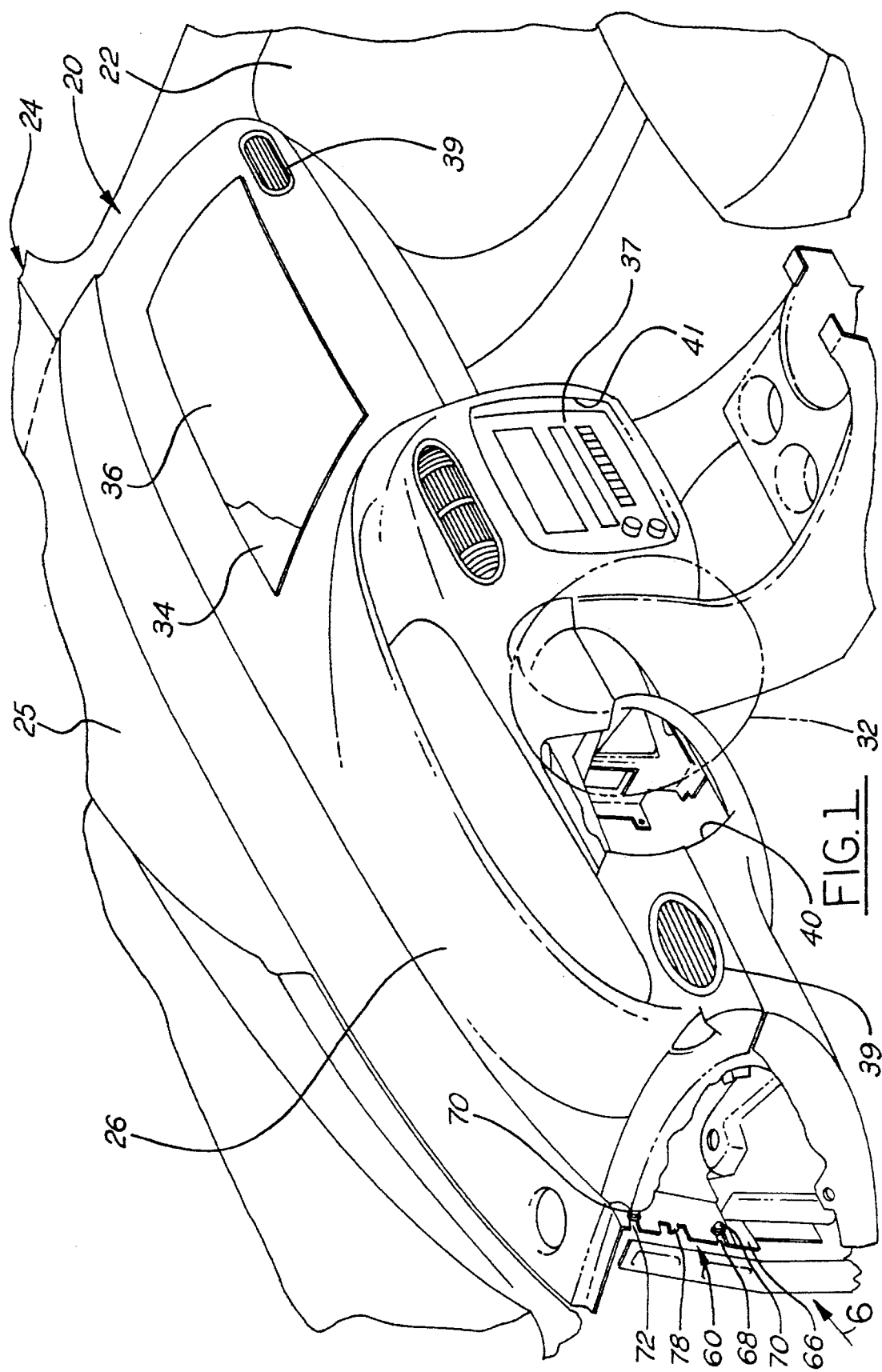
FIG. 1 is a perspective view with parts broken away showing a reinforced instrument panel assembly constructed in accordance with this invention installed in a motor vehicle.

Referring now more particularly to the drawings, an instrument panel 20 is shown in FIG. 1 mounted within the passenger compartment 22 of an automotive vehicle 24 in a position extending across the front of the passenger compartment below the front windshield 25.

The instrument panel assembly comprises an elongated instrument panel 26, an elongated reinforcing bar 28 extending lengthwise of the instrument panel, and a plurality of components or instruments associated with the instrument panel and including a steering column 30 with a steering wheel 32, a passenger air bag unit 34 behind a door 36 of the instrument panel 26, a radio 37, as well as other components such as wiring, duct work, etc., not shown.

The instrument panel 26 may be of any suitable construction and material and preferably is made of a relatively stiff, self-supporting, flexible thermoplastic capable of being molded to the desired configuration. It has appropriate openings, such, for example, as openings 39 for the air conditioning outlets, openings 40 and 41 for the steering column 30 and radio 37.

The reinforcing bar 28 is an elongated, rigid tubular member which may be box-shaped or rectangular in cross-section as shown. The reinforcing bar is preferably of a relatively thin wall construction, preferably having a wall thickness on the order of about 0.030 inches. The reinforcing bar is preferably formed with crush-inducing upsets 42 and openings 43 for a purpose to be more fully described hereinafter.

Hardware rigidly mounted on the reinforcing bar includes the bracket 44 which is welded or otherwise secured to the reinforcing bar and to which the steering column is attached by suitable fasteners. The bracket 44 has forwardly extending, laterally spaced arms 45 adjacent the driver side which are adapted to be secured to the cross frame member 46 of the vehicle body. The arms 45 have crush-inducing openings 47 therein. Cross frame member 46 is positioned forwardly of the reinforcing bar. Adjacent to the ends of the reinforcing bar at opposite sides of the vehicle are the vehicle side frame members or cowls 50 and 51 which have transverse flanges 52 that are substantially vertical, although somewhat curved as seen in FIG. 4 and perpendicular to the lengthwise dimension of the vehicle body. The side cowls also have transverse flanges 54 which are spaced forwardly of the transverse flanges 52 and which are also substantially vertical and perpendicular to the lengthwise dimension of the vehicle body. Other hardware welded or otherwise secured to the reinforcing bar 28 includes the brackets 55 to which the passenger air bag unit 34 is secured and the bracket 56 for a fuse block (not shown). The instrument panel 26 is secured by fasteners to framing 57 on the reinforcing bar and also by suitable supports 58 for the end caps of the instrument panel welded or otherwise permanently secured to the reinforcing bar.

On one end of the reinforcing bar 28 is a mounting bracket 60 and on the other end is a mounting bracket 62. The brackets 60 and 62 are welded or otherwise rigidly secured to the ends of the reinforcing bar and are substantially mirror images of each other although the fastener holes are somewhat different as will appear more fully hereinafter. Each bracket 60, 62 is Z-shaped in cross section, having a front mounting flange 64 and a rear mounting flange 66. The flanges 64 and 66 are spaced apart and are substantially parallel to each other and perpendicular to the lengthwise dimension of the reinforcing bar. Flanges 64 and 66 are integrally connected by a web 67 which is perpendicular to the flanges 64 and 66 and rigidly attached to the end of the reinforcing bar. The flanges are substantially flat, plate-like members of uniform thickness, although the rear flanges 66 are curved somewhat as seen in FIG. 4 to match the similar slight curvature of the flange 52 on the side cowls. The web 67 is also in the form of a flat plate of uniform thickness. The brackets 60, 62 may initially be formed from flat metal stock, with the rear mounting flanges 66 bent laterally outwardly and the front mounting flanges 64 bent laterally inwardly.

The rear mounting flange 66 of the bracket 60 has a horizontal slot 68 near the bottom for receiving a fastener 70, and a horizontal slot 72 near the top, also for receiving a fastener 70. The slots 68 and 72 extend inwardly from the laterally outer edge of the flange 66. Between the slots 68 and 72 is a vertically elongated notch 76 cut in the laterally outer edge of the rear flange. Extending from the base of the notch is a hook 78 which is bent forwardly so as to be perpendicular to the plane of the rear mounting flange 66 and substantially parallel to the web 67. The fasteners 70 are in the form of bolts and have heads 80 at one end of the threaded shanks 82. The shanks of these fasteners are adapted to thread into threaded holes in the flanges 52 of the side cowl 50. Sleeved on these threaded shanks and clamped between the rear mounting flange 66 and the fastener heads 80 are washers 84. These washers 84 are for a purpose which will become more apparent as this description proceeds and preferably formed of a suitable anti-friction material.

The front flange 64 of bracket 60 has upper and lower holes 81 for receiving fasteners 70 which thread into the flanges 54 of the side cowl 50.

The rear mounting flange 66 of bracket 62 has a hole 85 near the bottom for receiving a fastener 70, and a hole 86 near the top, also for receiving a fastener 70. The hole 85 is closed and the hole 86 is a slotted opening and in this respect the holes 85, 86 differ from the slots 68 and 72 in the flange 66 of bracket 60. The fasteners 70 thread into the flange 52 on the side cowl 51. Between the holes 85 and 86 is a vertically elongated notch 76 cut in the laterally outer edge of the rear flange 66. Extending from the base of the notch is a hook 78 which is bent forwardly so as to be perpendicular to the plane of the rear mounting flange 66 and substantially parallel to the web 67. The front flange 64 of the bracket 62 has upper hole 87 for receiving fastener 70 which threads into the side cowl flange 54.

A shake brace 90 is provided for stabilizing the steering column 30 during normal operation of the vehicle. The shake brace 90 is an elongated member having its rearmost end secured to the bracket 44 for the steering column and its forwardmost end secured to rigid vehicle frame structure. This shake brace extends generally longitudinally of the steering column in a fore and aft direction but with a somewhat greater downward inclination in the forward direction than the steering column. The shake brace has a crush-inducing formation 92 intermediate its ends which may consist of the material of the brace being flattened to reduce its resistance to lateral bending. In the event of a frontal impact, the shake brace will bend and collapse at this intermediate point to absorb some of the force of the driver's chest when the driver is thrown forward against the steering wheel in a frontal impact.

The instrument panel assembly 20, including the instrument panel 26, reinforcing bar 28 and all of the various components including the steering column, air bag unit 34, etc., is mounted on and secured to the side cowls 50 and 51. More specifically, the front mounting flanges 64 of the end brackets 60 and 62 are secured by fasteners 70 extending through holes 81 in the front flanges 64 thereof and into registering holes 94 in the transverse flanges 54 of the side cowls. The rear mounting flange 66 of end bracket 60 is secured to the transverse flange 52 of the side cowl 50 by fasteners 70 extending through the slots 68 and 72 in the rear mounting flange 66 and into registering holes 95 in the transverse flange 52 of the side cowls. Washers 84 are placed between the heads of the fasteners and the flange 66 of bracket 60. The rear mounting flange 66 of the end bracket 62 is secured in a similar manner except that one fastener extends through a hole, and another fastener extends through a slot, in the rear mounting flange 66.

The transverse flanges 52 of the side cowls also have openings 98 which register with the hooks 78 of the end brackets 60, 62 so that when the instrument panel assembly is moved forwardly into position for final attachment by the fasteners 70, the hooks 78 will first enter the openings 98 to locate the end brackets 60, 62 of the instrument panel assembly in proper position for final attachment.

In use, the instrument panel assembly 20 is completely made up and assembled prior to installation in the vehicle body. In other words, the instrument panel 26 is secured to the reinforcing bar 28 and the various components or instruments associated with the instrument panel are also secured to the reinforcing bar 28 or to brackets on the reinforcing bar. These operations are all completed before the instrument panel assembly 20 or any of the parts thereof are installed in the vehicle body.

After the instrument panel assembly 20 is completely assembled outside the vehicle body, the instrument panel assembly 20 is introduced as a unit into the vehicle body. With a simple forward movement guided by the hooks 78 on the end brackets 60, 62 entering openings 98, the instrument panel assembly 20 is placed in its ultimate installed position with the mounting flanges 64, 66 in engagement with the transverse flanges 52, 54 of the side cowls 50 and 51, and with the fastener holes in the mounting flanges 64, 66 aligned with the registering holes in the transverse flanges 52, 54. The instrument panel assembly is moved to this installed position with a simple forward movement by an installer positioned within the passenger compartment. The installation is then completed by driving in the several fasteners 70 required to secure the end bracket 60, 62 to the frame of the vehicle body. The end brackets 60, 62 are in positions readily accessible to the installer who has only to drive in the fasteners 70 to complete the installation. (See FIGS. 2, 3 and 11.) As seen in FIGS. 2 and 6, a depending part 99 of the bracket 56 for the fuse block extends over the lower portion of the rear face of the front flange 64 of end bracket 60. However, this part 99 has a hole which registers with the lower hole 81 in the flange 64 so that a fastener 70 may be readily installed through the holes in part 99 and flange 64 into the hole in the transverse flange 54 of the side cowl 50.

In the final installed position, the webs 67 of the brackets 60, 62 overlie the inwardly facing surfaces 100 of the side cowls 50 and 51 of the body frame, in close, parallel, flush contacting relation thereto. The surfaces 100 and webs 67 are substantially vertical and parallel to the lengthwise dimension of the vehicle body as originally assembled. As a result, the instrument panel assembly 26, and particularly the reinforcing bar 28, serves as a brace to resist the crushing effect of a side impact on the vehicle body.

In the event of a frontal impact in which the driver is thrown forwardly against the steering wheel, a transverse force is imposed on the reinforcing bar 28. The reinforcing bar 28 is designed to collapse under a transverse force, because of the crush-inducing upsets and openings formed therein. When thus bent and collapsed into the condition shown in FIG. 5, it will be noted that the rear mounting flange 66 of the bracket 60 on the driver side has pulled away from the fasteners 70 in an inward direction and has actually become released and separated from the fasteners 70. This pulling away of the rear mounting flange 66 is permitted because of the slotted nature of the openings 68 and 72. The washers 84 provided between the heads of the fasteners 70 and the slotted openings contribute to the relative ease with which the flanges 66 can pull away from the fasteners under the force of a driver thrown against the steering column in a frontal impact. These washers are preferably formed of an anti-friction material. The front flanges 64 of brackets 60, 62 and the rear flange 66 of bracket 62 remain attached to the side cowls because the openings therein through which the fasteners 70 extend are closed rather than slotted openings and hence the end of the reinforcing bar adjacent to the driver's side will in effect pivot about the front flange 64 of bracket 60 to allow the reinforcing bar to assume the forwardly bent and distorted condition shown in FIG. 5. This forward bending of the reinforcing bar is assisted further by crush-inducing upset 42 and openings 43 and acts as a cushion on the driver in a frontal impact. The crush-inducing formations in the reinforcing bar do not, however, appreciably weaken the resistance of the bar to longitudinal compression in a vehicle side impact.

When the reinforcing bar 28 bends and distorts in a frontal impact, the bracket arms 45 crush or collapse as shown in FIG. 5, assisted by the crush-inducing formations 47 therein.

The shake brace 90 will also, in a frontal impact, collapse because of the crush-inducing formation 92 formed intermediate its ends.

What is claimed is:

1. A reinforced instrument panel assembly capable of being preassembled and then installed as a unit in a motor vehicle having laterally spaced interior side frame members adjacent the front of the passenger compartment on the driver side and passenger side, respectively, said instrument panel assembly comprising:

(a) an elongated instrument panel, (b) a plurality of motor vehicle components, (c) an elongated, rigid reinforcing bar having opposite ends and extending lengthwise of said instrument panel, (d) means mounting said instrument panel and said components on said reinforcing bar, and (e) a bracket secured to each end of said reinforcing bar, (f) said brackets each having at least one mounting flange, said mounting flanges lying in planes generally parallel to the length of said reinforcing bar and, when said instrument panel assembly is placed in installed position in the motor vehicle with said reinforcing bar extending transversely thereof, said mounting flanges are so disposed as to be generally upright and to extend transversely of the motor vehicle and to overlie the respective side frame members of the motor vehicle in positions readily accessible to an installer occupying the passenger compartment, and (g) means for securing said mounting flanges to said respective side frame members, (h) said securing means comprising at least two fastener-receiving openings in the mounting flange on the driver side, (i) a fastener adapted to extend through each of said openings into said side frame member on the driver side, and (j) the mounting flange on the driver side having a laterally outer edge and the openings therein being slotted openings which open laterally outwardly through said laterally outer edge so that said mounting flange on the driver side can pull away from the fasteners extending through the slotted openings therein in the event of a vehicle frontal impact when the driver is thrown forwardly against the instrument panel assembly.

2. A reinforced instrument panel assembly as defined in claim 1, wherein said reinforcing bar has crush-inducing formations which facilitate transverse bending and crushing of said reinforcing bar in the event of a frontal impact as aforesaid but without appreciably weakening the resistance of said bar to longitudinal compression in the event of a vehicle side impact.

3. A reinforced instrument panel assembly as defined in claim 1, wherein said reinforcing bar is a tubular member and has a wall thickness of about 0.030 inches.

4. A reinforced instrument panel assembly as defined in claim 1, wherein the fasteners on the driver side are bolts having heads overlying the mounting flange on the driver side in pressure contact therewith, and a washer between each said head and the mounting flange on the driver side whereby the bolt pressure contact and the washer friction determine the force required to allow slip of the mounting flange on the driver side during chest impact.

5. A reinforced instrument panel assembly as defined in claim 4, wherein said washers provide controlled friction which provides slip of the mounting flange on the driver side under chest impact loads.

6. A reinforced instrument panel assembly as defined in claim 1, wherein said motor vehicle instruments include a steering column, a steering column bracket connecting said steering column to said reinforcing bar, an elongated shake brace for stabilizing said steering column extending generally longitudinally thereof, said shake brace having one end connected to said steering column bracket and having its other end adapted to be connected to rigid vehicle support structure, said shake brace having an intermediate portion providing a crush initiator to facilitate bending in the event of a vehicle frontal impact.

7. A reinforced instrument panel assembly as defined in claim 1, and further including bracket arms secured to said reinforcing bar and projecting forwardly therefrom, said bracket arms having front ends adapted to be secured to vehicle support structure, said bracket arms having weakened, crush-inducing formations adapted to facilitate crush and collapse of said bracket arms when loaded in compression in a vehicle frontal impact.

8. A reinforced instrument panel assembly as defined in claim 7, wherein said bracket arms are located adjacent the driver side of the vehicle.

9. A reinforced instrument panel assembly as defined in claim 2, wherein said reinforcing bar is a tubular member of rectangular cross-section and has a wall thickness of about 0.030 inches.

10. A reinforced instrument panel assembly as defined in claim 9, and further including bracket arms secured to said reinforcing bar adjacent the driver side of the vehicle, said bracket arms projecting forwardly from the reinforcing bar, said bracket arms having front ends adapted to be secured to vehicle support structure, said bracket arms having weakened, crush-inducing formations adapted to facilitate crush and collapse of said bracket arms when loaded in compression in a vehicle frontal impact.

11. A reinforced instrument panel assembly as defined in claim 10, wherein the fasteners on the driver's side are bolts having heads overlying the mounting flange on the driver side, and a washer between each said head and the mounting flange on the driver side, said washers each being a controlled frictional member.

12. A reinforced instrument panel assembly as defined in claim 11, wherein said motor vehicle components include a steering column, a steering column bracket connecting said steering column to said reinforcing bar, an elongated shake brace for stabilizing said steering column extending generally longitudinally thereof, said shake brace having one end connected to said steering column bracket and having its other end adapted to be connected to rigid vehicle support structure, said shake brace having an intermediate portion providing a crush initiator to facilitate lateral bending in the event of a vehicle frontal impact.

\* \* \* \* \*